United States Patent [19]

Carson

[11] 3,821,793

[45] June 28, 1974

[54] VISUAL SIMULATOR EMPLOYING TWO-COLOR TELEVISION SYSTEM

[75] Inventor: Edward R. Carson, Akron, Ohio

[73] Assignee: Goodyear Aerospace Corporation, Akron, Ohio

[22] Filed: June 8, 1972

[21] Appl. No.: 260,880

[52] U.S. Cl. ...... 178/5.4 CF, 178/5.4 SY, 178/5.2 R

[51] Int. Cl. .......... H04n 9/22

[58] Field of Search ......... 178/5.2 R, 5.4 R, 5.4 CF, 178/5.4 SY, 5.4 W

[56] References Cited

UNITED STATES PATENTS

| | | | |
|---|---|---|---|
| 2,413,423 | 12/1946 | Wilson | 178/5.4 CF |
| 2,531,834 | 11/1950 | Sziklai | 178/5.4 SY |
| 2,662,111 | 12/1953 | Poliakoff | 178/5.4 CF |
| 2,921,118 | 1/1960 | Benjamin | 178/5.4 CF |
| 3,312,781 | 4/1967 | Land | 178/5.4 W |
| 3,600,504 | 1/1970 | Reilly | 178/5.4 CF |
| 3,654,385 | 4/1972 | Flagle | 178/5.4 CF |

*Primary Examiner*—Richard Murray
*Attorney, Agent, or Firm*—Oldham & Oldham

[57] ABSTRACT

A two-color, high resolution video generation system. An object is scanned by a television camera through a rotating color wheel which has alternating filter segments of two different colors. The camera output signal is transmitted to a television projector which projects the image through a second rotating color wheel to a screen. The second rotating color wheel also has filters arranged in alternate segments preferably of the same two colors depending on the application. Means are provided for maintaining the two-color wheels in a synchronous rotation and for maintaining the television camera and projector in synchronization with one another and with the color wheels.

5 Claims, 9 Drawing Figures

PATENTED JUN 28 1974

3,821,793

VISUAL SIMULATOR EMPLOYING TWO-COLOR TELEVISION SYSTEM

The present invention relates to a visual simulator of the type which views an object or model and projects the image thereof onto a screen to simulate a real life situation. Such simulations may be used, for example, in flight trainers to provide a trainee with a simulation of an approaching landing strip.

In order to enhance the realism of the simulated image, it is preferable that the image be in full color. However, the cost and complexity of conventional color television apparatus is such that full color simulation is not practical. Conventional color television apparatus employs a three color system, normally red, green, and blue. Such a system requires either three or four pickup tubes with associated color selective optical channels. As a result, mechanical, optical, and electronic alignment and stability are critically important to good performance. The display portion of a simulator system using conventional color television apparatus imposes essentially the same problems as the outputs from three or more projection devices must be superimposed to form the final color picture.

According to the Land phenomenon, the human eye can create virtually a full gamut of colors from inputs of only two wavelengths. By employing the Land phenomenon, a color visual simulation system can be substantially simplified as only two color inputs are required. Further simplification of the simulator system can be achieved by using a single television camera and projector and presenting the images in rapid succession and alternating colors so that the eye detects successive images in superimposed relation.

It is the primary object of the present invention to provide a visual simulator system utilizing the Land phenomenon to present color simulation of a model or object.

A further object of the invention is the provision of a visual simulation system which is of substantially reduced cost and complexity over conventional color simulation systems.

Yet another object of the invention is the provision of a color visual simulation system utilizing a single television camera and projector to obtain high or improved simulated picture resolution.

It is also an object of the invention to provide a color visual simulation system which may be operated in either a two or three color mode.

The above and other objects of the invention which will become apparent in the following detailed description are achieved by providing a visual simulation system which consists, essentially, of a television camera adapted to scan the object or model through a rotating color filter wheel having segments of two alternating colors, a television projector receiving an output signal from the camera and projecting the image of the object or model onto a screen through a second rotating wheel also having segments preferably of the same two colors depending on the situation, and means to maintain synchronization between the two color wheels, the camera, and the projector.

For a more complete understanding of the invention and the objects and advantages thereof reference should be had to the following detailed description and the accompanying drawing wherein there is shown a preferred embodiment of the invention.

Figures 1, 2:
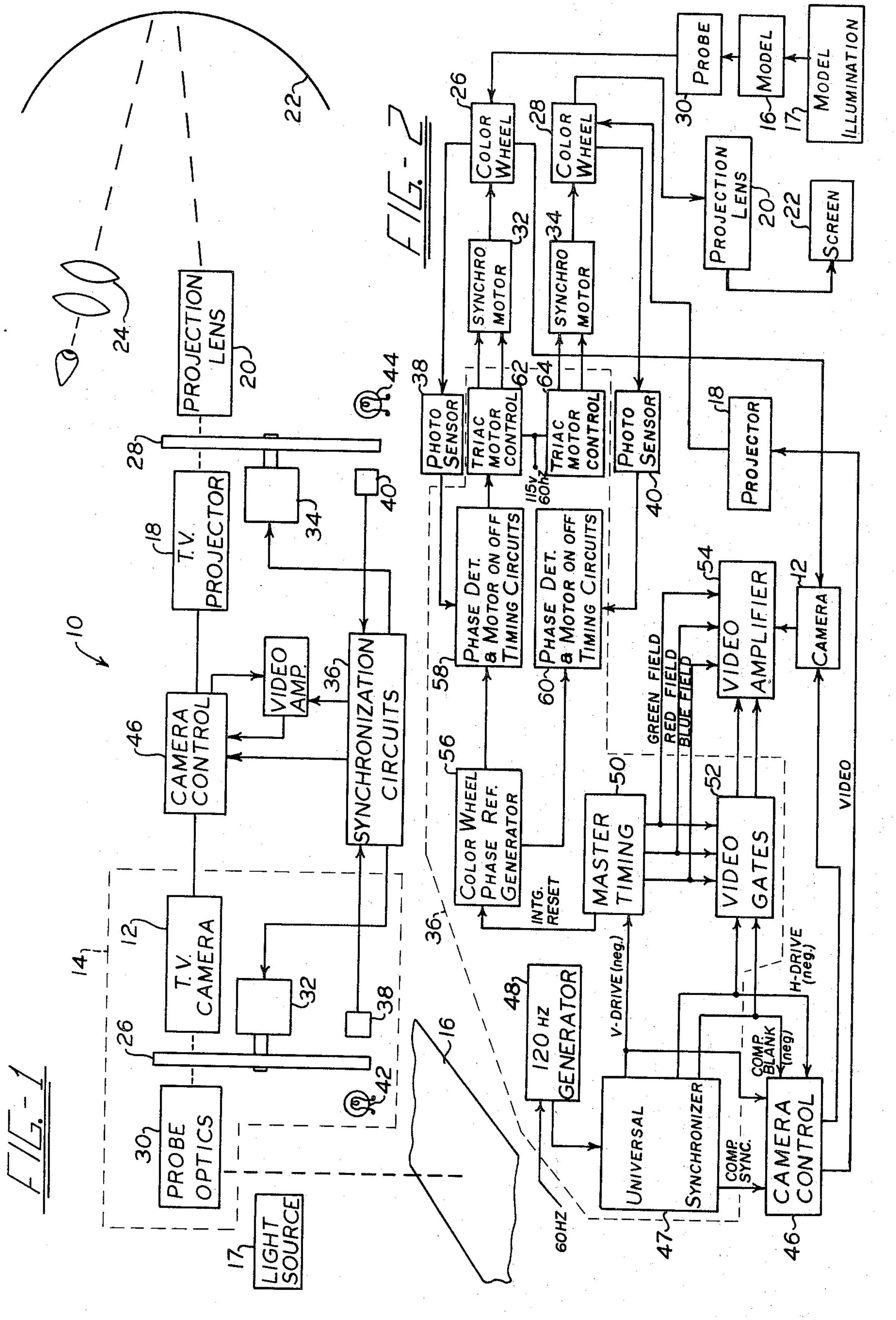
FIG. 1 is a schematic diagram of the visual simulation system of the present invention.
FIG. 2 is a schematic block diagram of the control circuits of the system of FIG. 1.

The visual display system illustrated in FIG. 1 is designated generally by the reference numeral 10. The particular embodiment of the system 10 illustrated provides a simulated landing presentation in color. A camera 12, mounted in an optical probe 14, is moved or "flown" over a model 16 representing a landing field. It will be understood, however, that the visual simulator system of the present invention may be used for other simulations.

A projector 18 receives the processed camera video and projects the TV image, through a projection lens 20, onto a semi-specular screen 22. The image is then viewed through a collimating lens 24 which infinitizes the display. The display is presented in color through the use of two synchronized color wheels or discs 26 and 28, one wheel 26 being located between the camera 12 and the probe optics 30 while the other wheel 28 is situated between the projector head 18 and the projection lens 20. As will be discussed more fully below, the color wheels are divided into segments with red and green filters occupying alternate segments.

A synchronization circuit 36 maintains the filter wheel drive motors 32 and 34 in synchronized relation to one another and in synchronization with the camera control unit 46. Thus, red and green fields are alternately presented to the TV camera 12 and are processed as black and white images. When the image is projected through the color wheel 28 it passes through the filter of the same color so that alternate color images are projected to the screen 22. The rate at which the alternating images are projected is such that the eye does not detect the separate color images but rather senses a superposition of successive images. As a result, the eye perceives a color image. In the preferred embodiment, red and green filters are employed as these two colors permit the most faithful duplication of earth colors. Obviously, other color combinations may be used in place of red and green.

The use of only two colors in the system disclosed permits a simplification of the system and enables the system to achieve a high degree of resolution. If greater color fidelity is required, this can be achieved by using three different colored filters, for example red, green and blue, in alternating relation for both the camera color wheel 26 and the projector color wheel 28. Such a system, however, will possess lower resolution than the two color system.

The synchronization circuit 36 is shown in greater detail in FIG. 2. The circuit 36 operates under the control of a universal synchronizer 46 which transmits synchronizing pulses to a master timing circuit 50, video gate circuit 52, and the camera control circuit 46. The synchronizer is fed from a 120 Hz generator 48. The synchronizer 47 may, for example, be a model 101-B synchronizer manufactured by Arden Engineering, Inc. of 4 Blue Goose Road, St. Paul, Minn. 55110. As was pointed out above, the camera 12 receives successive fields of different colors. Since the amplitudes of the fields may vary as a function of filter transmission, a video unbalance between the fields may be present. In order to compensate for the variations in amplitude and to achieve a video balance between fields the camera video signal is separated into separate fields, individually amplitude adjusted, and then reunited. This is accomplished by the video amplifier circuit 54 and the master timing circuit 38. The adjusted camera video signal is provided to the camera control circuit 46. The video amplifier circuit 54 also supplies a separate output, a test video output, which is used to align the projector color wheel 28. The test video provides a red field only, a green field only, or, in a three color system, a blue field only, or any combination of the fields.

The two color wheels 26 and 28 must be phase locked to the TV raster to produce a color picture. Ideally, the camera color wheel should bathe the target surface of the camera 12 in red light preceding the red field and in green light preceding the green field. Then, as the red field is read out, in a line by line manner, the color wheel 26 should follow directly with green light to the now discharged target surface. This close tracking, however, is difficult to accomplish.

Figures 5, 6, 7:
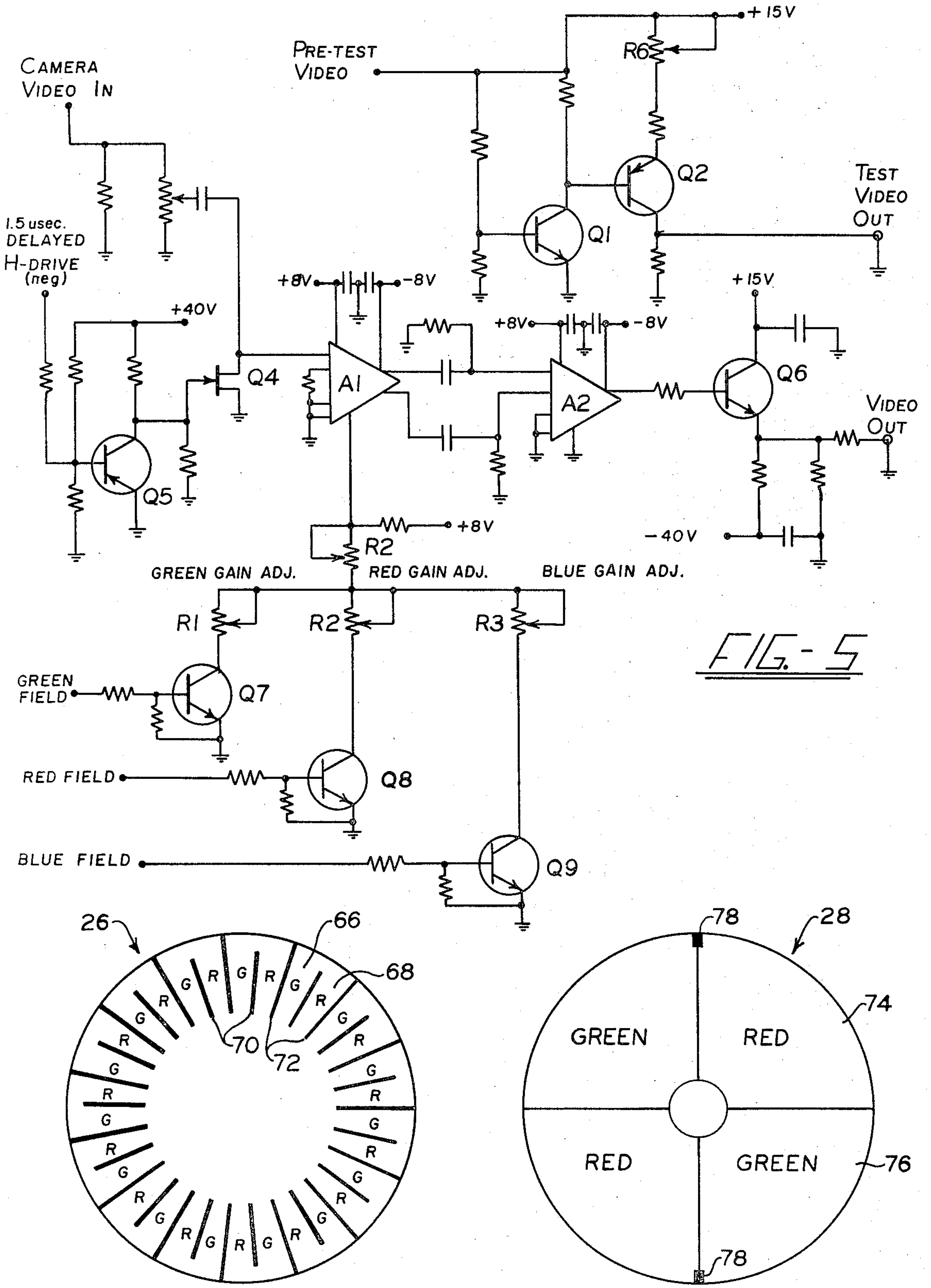
FIG. 5 is a schematic diagram of the video amplifier circuits.
FIG. 6 is an elevational view of the camera color filter wheel.
FIG. 7 is an elevational view of the projector color filter wheel.

In order to prevent contamination of the target surface by the wrong color the camera filter wheel 26 is provided with opaque regions between the alternating filter regions. As is shown in FIG. 6, the green and red filter regions 66 and 68, respectively, are separated by opaque bands 70 and 72. The bands 72 extend to the outer circumference of the filter wheel 26 to provide timing marks. The function of these marks will be described in greater detail below. The opaque areas 70 and 72 account for approximately 20 to 25 percent of the total filter area. This causes a corresponding loss in exposure of target surface and, to preserve color separation, the filter must be properly phased relative to the raster scan and correctly track the raster lines throughout the scan. The number of filter segments 66 and 68, the wheel rotational speed, and the percentage of black area are interdependent. With a fixed target size, the larger the wheel, the more filter segments required. In addition, the rotational speed and the percentage of black areas becomes smaller.

The projector color wheel 28 is shown in FIG. 7. This filter has alternate red and green filter segments 74 and 76 and is provided with a pair of timing marks 78 located diametrically opposite the points on the circumference of the wheel. The projection color wheel 28 is phased relative to the raster so as to project through a red filter when a red field is displayed, at a green filter when a green field is displayed. Ideally, the filter must maintain this coverage throughout the excited phosphorus active lifetime with a resonable fast phosphor decay, approximately 4 ms, tracking can be achieved without undue difficulty. Thus, separation between the regions 74 and 76 is not necessary.

The camera and projection color wheels 26 and 28, respectively, must be phased locked to the TV raster with each wheel achieving a different phase. The color wheels are driven by synchronous motors 32 and 34, respectively, which provide constant rotational speed locked to the 60 Hz line frequency. The TV field rate is also phase locked to the line frequency. As will be seen from FIG. 1, a light source 42 is mounted on one side of the color wheel 26 so that the beam from the light source intersects the timing marks 72 of the color wheel 26 blocking light to a photosensor 38. Likewise, a light source 44 and photosensor 40 are provided in conjunction with the wheel 28 so that pulses are generated by the timing marks 78 of the projector color wheel filter 28. These pulses are supplied to phase detector and motor timing circuits 58 and 60 which, through the triac motor control circuits 62 and 64 control the synchronous drive motors 32 and 34 of the color wheels 26 and 28, respectively. Pulse signals from the color wheel phase reference generator circuit 56 are also supplied to the phase detector circuits 58 and 60 to maintain these circuits in synchronization with the TV raster.

Figures 3, 4:
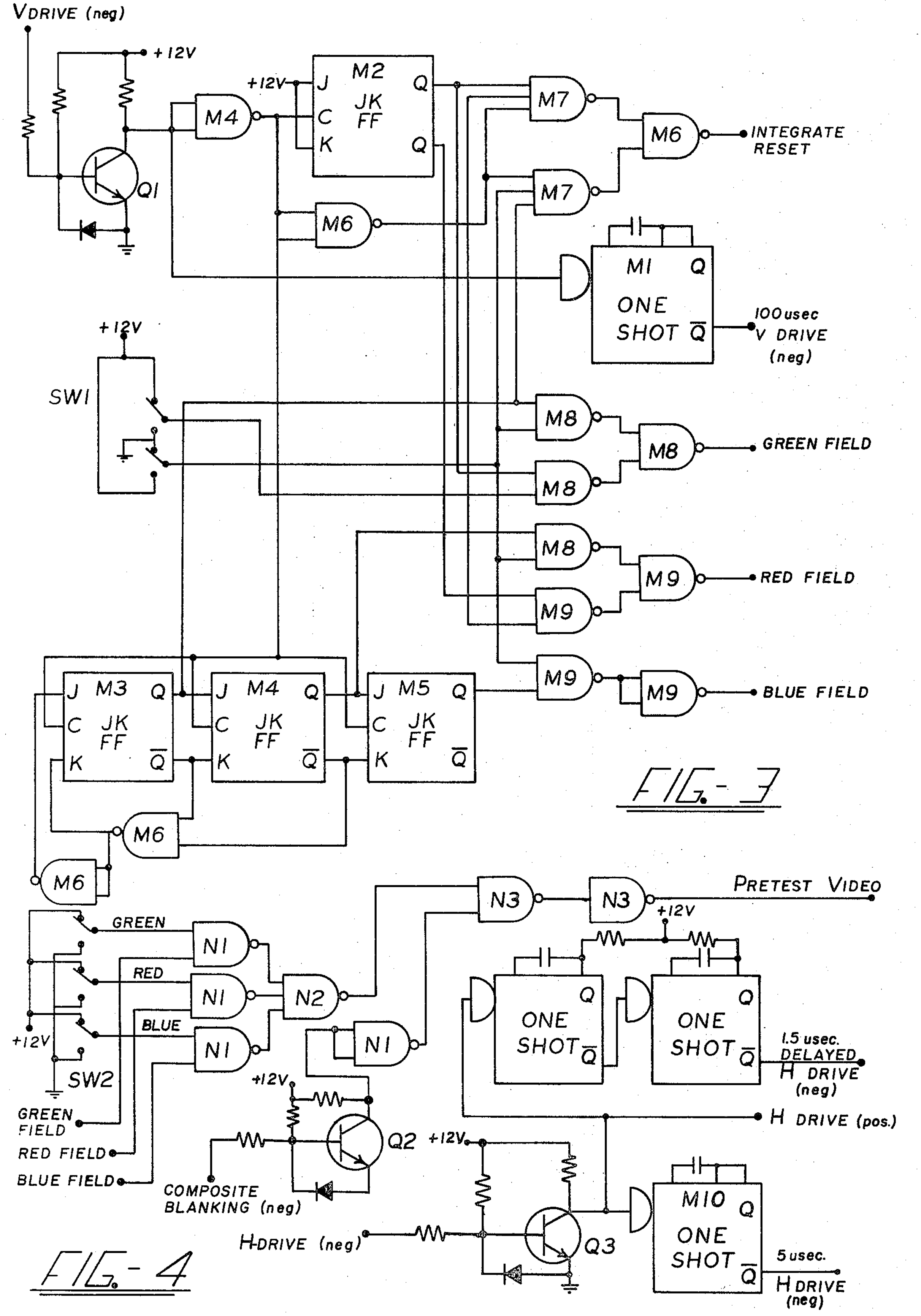
FIG. 3 is a schematic diagram of the master timing circuit.
FIG. 4 is a schematic diagram of the video gate circuits.

The master timing circuit 50 is shown in greater detail in FIG. 3. This circuit accepts a negative vertical drive pulse from the universal synchronizer 47. The master timing circuit produces three outputs; a 100 us vertical drive pulse, an integrator reset pulse, and positive field gates. The field gate signals may be selected so that the system operates in either a two or three color mode. In a two color system, the blue output pulse remains negative while the red and green outputs alternate positive. In a three color system, the three outputs sequentially alternate.

A one shot multivibrator M1 provides the 100 us vertical drive output, triggered by the output of transistor Q1. A JK flip-flop M2 divides the 120 Hc vertical drive pulse by two and JK flip-flops M3, M4 and M5 serve as a divide by three counter. The outputs of the two counters (divide by two and divide by three) are fed to the two sets of AND-OR-INVERT gates composed of the elements M6, M7, M8 and M9. In a two color system, the two color/three color selection switch SW1 enables the appropriate AND gates to provide an integrator reset pulse for every other field and causes the red and green outputs to alternate going positive while holding the blue output at a negative level. In a three color system, the AND gates are appropriately enabled to select the divide by three counter outputs which enable the red, green and blue outputs to sequentially alternate going positive while the integrator reset output pulse occurs at every third field. These outputs serve as a reference for the whole system and establish the red, green and blue fields.

A video gate circuit of FIG. 4 accept the red, green and blue field inputs from the master timing unit 50 and the composite blanking gate signal and horizontal drive signal from the universal synchronizer 47. The outputs of the video gate circuits are the pretest video, 1.5 us delayed horizontal drive pulse, and positive and negative horizontal drive pulses. Transistors Q2 and Q3 serve to buffer and invert the composite blanking and horizontal drive input signals. The positive Q3 is brought directly up and is shaped and inverted in a one shot multivibrator M10 to provide a 5 us horizontal drive negative output. One shot multivibrator M11 is triggered by the Q3 output and its trailing edge triggers one shot multivibrator M12. M12 provides a 1.5 us horizontal drive pulse delayed by 2 us from the master horizontal drive pulse. This pulse is used to drive a FET clamp in the video amplifier and is delayed by 2 us to avoid clamping on sweep transients present on the video signal. The pretest video output signal is essentially a positive field gate, chopped by the composite blanking signal. Nand gates N1, N2, and N3 are wired in AND-OR Invert circuits, and when appropriately enabled by the test video field select switches SW2 provide a red field gate, a green field gate, or a blue field gate at the pretest video output. The video amplifier circuit 54 of FIG. 5 accepts the signals from the video gates circuit 52 and the camera preamp video and provides a test video output and a video output. The camera video input is sent to an amplifier A1 which is a gate controlled two channel input wideband amplifier, the signal being sent through the FET clamp Q4. The FET Q4 is driven by the transistor Q5. Only one channel of the amplifier A1 is used and the other channel is grounded. Amplifiers A1 and A2 are cascaded with amplifier A1 providing a double-ended output and amplifier A2 a single-ended output which is buffered by the emitter follower circuit of transistor Q6. In order to provide separate amplitude compensation for the separate fields, three separate potentiometers R1, R2, and R3 are provided for gain adjustment of the amplifier A1, the transistors Q7, Q8, and Q9, respectively, determining which of the potentiometers is active in the circuit. The transistors are responsive to the field output signals of the video gate circuit 52.

Figure 8:
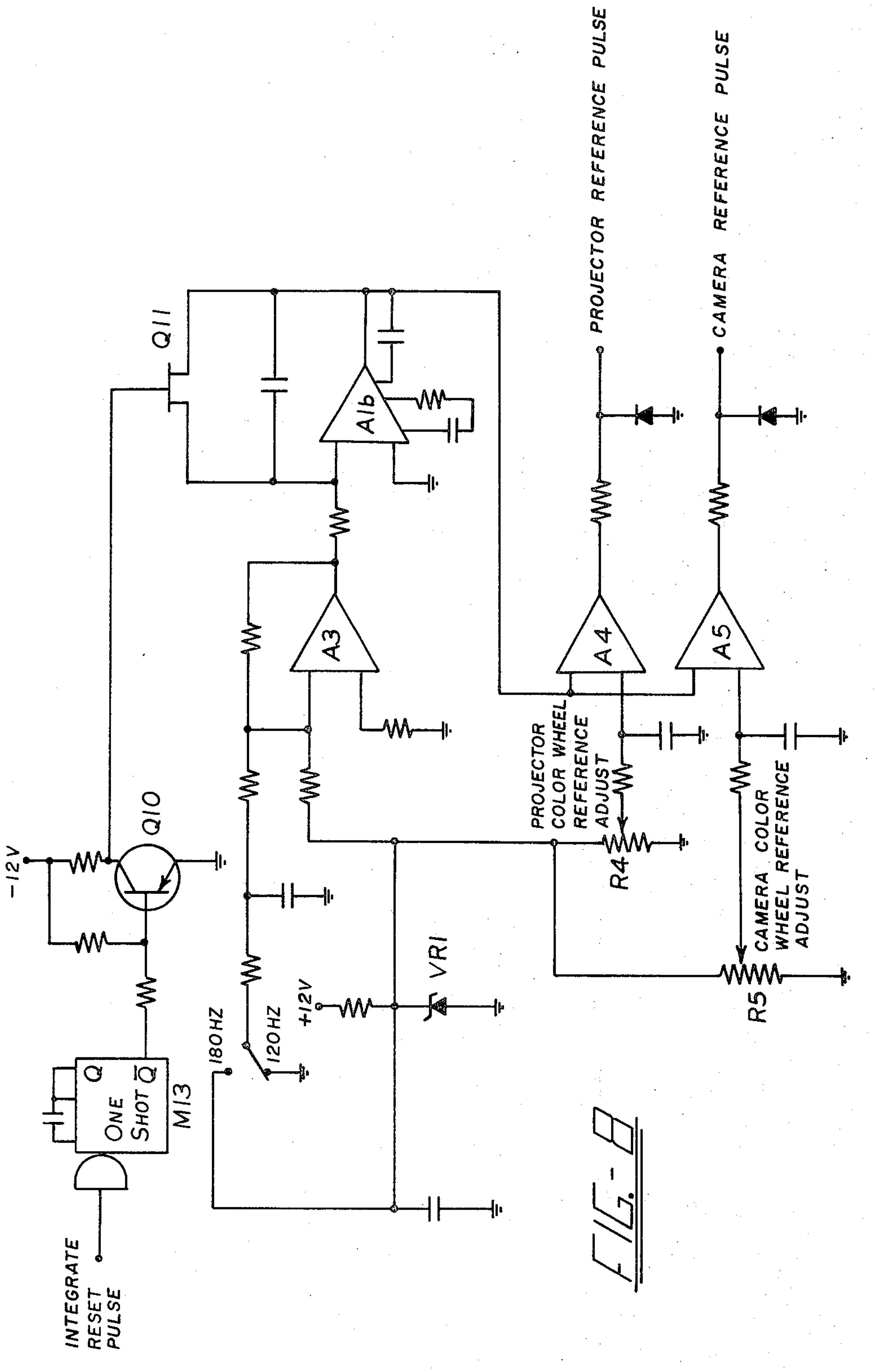
FIG. 8 is a schematic showing of a color wheel phase reference generator circuit.

The color wheel phase reference generator circuit 56 is illustrated in FIG. 8. This circuit accepts integrator reset pulse from the master timing unit 50 and provides two outputs, a camera reference pulse signal and a projector reference pulse signal. The integrator reset pulse triggers a one shot multivibrator M13 which resets the sawtooth generator (integrator A3) through transistor Q10 and FET switch Q11. Diode VR1 provides the voltage to the integrator through the operational amplifier A3 and to the two comparators A4 and A5 through the two reference potentiometers R4 and R5. The positive integrator sawtooth is compared to the reference voltages in the two comparators. When the sawtooth waveform exceeds the reference input the comparatives go positive. The comparators return to ground during reset.

Figure 9:
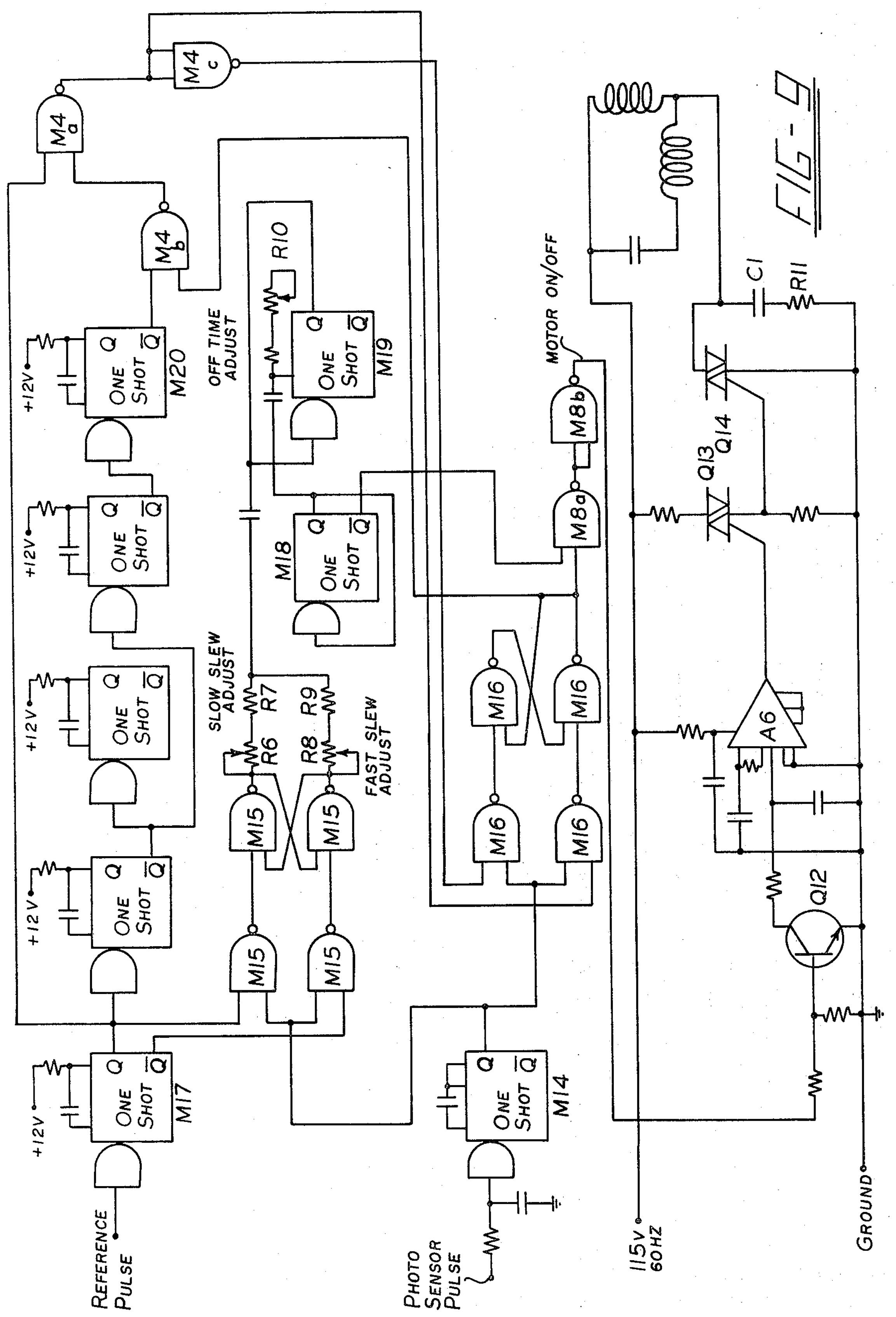
FIG. 9 is a schematic showing of the phase detector and motor timing circuits.

Control of the color wheel drive motors 26 and 28 is achieved by the phase detection circuit 58 and triac motor control circuits 62 and 64. These circuits, for one motor, are illustrated in FIG. 9. It will be understood that the circuits for controlling the other motor are of identical construction. The circuit of FIG. 9 accepts the reference pulse signal from the color wheel phase reference generator circuit 56 and a photosensor pulse signal from the corresponding one of the photosensors 38 and 40. The reference pulse triggers a chain of one shot multivibrators which set up the timing intervals. The trailing edge of the leading one shot triggers the next one in line. The photosensor pulse is shaped in the one shot multivibrator M14 to provide a 5 us pulse. The photosensor pulse is filtered to prevent false triggering. The 5 us photosensor pulse is sent to two RS flip-flops M15 and M16. M15 is enabled by the two MS overlap gate (Q and Q of M17) when the photosensor pulse is inside the two MS overlap gate, the flip-flop is set and when the pulse is outside this gate the flip-flop is reset. The state of the M15 flip-flop determines the frequency of the astoble multivibrator constructed from two cross-coupled one shot multivibrators M18 and M19. When the flip-flop M15 is on or set the slow slew resistors R6 and R7 are energized. When the flip-flop M15 is in the off state, positive voltage is sent to R8 and R9 the fast slew resistors. In addition, the pulse width (off time) of the astable multivibrator is set by R10, the off time potentiometer. RS flip-flop M16 is enabled by the reference pulse output of M20. When the reference pulse and photosensor pulses are coincident the flip-flop M16 is set. When the pulses are not coincident the flip-flop is reset.

The triac motor controlled turns the motor on or off in response to the motor on/off command. The unit consists of a zero voltage switch and two triacs. The voltage switch supplies positive trigger pulses at the zero crossings of the 115 volt 60 Hz power input. When transistor Q12 is on pin 14 of A6 is grounded, and the action of the zero voltage switch is suppressed, that is no output pulses are generated. With transistor Q12 off, output pulses are present and triac 22 is turned on at every zero crossing. Q13 drives Q14 and turns it on and off as appropriate. Since Q14 drives an inductive load it does not turn off at zero crossings. Therefore, Q13 is necessary to provide the buffering to turn on Q14 as the previous half cycle is terminated. The zero voltage switch thus allows proper interruption with minimum noise induction. Triac Q14 is bypassed by resistor R11 and capacitor C1 to prevent excessive voltages surges. Q14 provides a ground return to the motor. When it is continuously triggered, Q14 acts as a closed switch and the motor runs normally. When the trigger pulses are interrupted, the triac Q14 remains off and the motor receives no power.

As was pointed out above, this pulsed interruption of the motors is employed to bring the color wheel drive motors into synchronization with the TV raster and with one another. The system permits the precise and rapid adjustment to achieve synchronization.

While only the best known embodiment of the invention has been illustrated and described in detail herein, it will be understood that the invention is not limited thereto or thereby. Reference should therefore be had to the appended claims in determining the true scope of the invention.

What is claimed is:

1. A high resolution video generating system for a visual simulator, comprising:

a television camera adapted to view an object and produce a video output signal corresponding to the object;

first filter means interposed between the television camera and the object, the filter means having a large number of segments alternately comprised of two different colors;

means to move the first filter means whereby the camera views the object alternately through the segments; and wherein the number of segments is dependent on the speed of movement of the first filter and the raster rate of the television camera so that a different segment is between the camera and the object for each complete raster scan of the camera, a television projector receiving the video signal from the camera and projecting an image corresponding thereto;

second filter means interposed between the television projector and the viewer, the second filter means having four segments of alternately the same two colors as the first filter segments;

means to move the second filter means whereby the image is projected alternately through the segments of the second filter means; and an amplifier circuit receiving the video output signal, amplifying the signal and supplying the amplified signal to the projector, synchronizing means controlling the means to move the first and second filter means whereby the image is projected through a predetermined color filter at the same time that it is viewed through a predetermined colored filter by the camera, said synchronizing means including means to selectively vary the gain of the amplifier circuit in coordination with the color of the filter segment through which the object is being viewed.

2. The video generating system according to claim 1 further including an amplifier circuit receiving the video output signal, amplifying the signal, and supplying the amplified signal to the projector, the synchronizing means including means to selectively vary the gain of the amplifier circuit in coordination with the color of the filter segment through which the object is being viewed, said filter means including timing marks, and photocell and light source means to monitor the timing marks and to provide an input signal to the synchronizing means of the position of the filter means.

3. The video generating system according to claim 2 wherein the motors are synchronous motors, the synchronization circuit including circuit means for controlling each motor and operative to momentarily interrupt current flow to the motor in the event the associated color wheel is out-of-phase.

4. The video system according to claim 3 wherein means are provided for generating an integral number of pulses for each revolution of each color wheel, the synchronization circuit including means for comparing the pulses generated upon rotation of the wheels with a reference pulse signal to control the circuit means.

5. The video generating system according to claim 1 wherein the first filter means comprises a first color wheel having an opaque region separating each segment, and such opaque regions constitute between 20 percent to 25 percent of the total area of the color wheel.

* * * * *